US009391812B2

(12) United States Patent  
Luo (10) Patent No.: US 9,391,812 B2  
(45) Date of Patent: Jul. 12, 2016

(54) CHANNEL ESTIMATION METHOD AND RECEIVER

(71) Applicant: Huawei Technologies Co., Ltd., Shenzhen, Guangdong (CN)

(72) Inventor: Xiaojun Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/971,853

(22) Filed: Dec. 16, 2015

(65) Prior Publication Data

US 2016/0105293 A1    Apr. 14, 2016

Related U.S. Application Data

(63) Continuation of application No. PCT/CN2013/078123, filed on Jun. 27, 2013.

(51) Int. Cl.
*H04L 27/06* (2006.01)
*H04L 25/02* (2006.01)

(52) U.S. Cl.
CPC ........ *H04L 25/0204* (2013.01); *H04L 25/0248* (2013.01); *H04L 25/0256* (2013.01)

(58) Field of Classification Search
CPC ............ H04L 25/0204; H04L 25/0248; H04L 25/0256
See application file for complete search history.

(56) References Cited

U.S. PATENT DOCUMENTS

| 7,248,657 B2 | 7/2007 | Aromaa et al. |
| 2004/0017844 A1 | 1/2004 | Pajukoski |
| 2006/0146755 A1* | 7/2006 | Pan ...................... H04B 7/0417 370/334 |
| 2008/0081570 A1* | 4/2008 | Jeong ................... H04B 7/0874 455/101 |
| 2012/0020432 A1 | 1/2012 | Kim et al. |
| 2012/0269248 A1 | 10/2012 | Lee et al. |
| 2014/0140383 A1* | 5/2014 | Jiang ................... H04L 25/0202 375/227 |

FOREIGN PATENT DOCUMENTS

| CN | 1461157 A | 12/2003 |
| CN | 1808949 A | 7/2006 |
| CN | 1862997 A | 11/2006 |
| EP | 1 821 445 A1 | 8/2007 |
| WO | WO 2011/083876 A1 | 7/2011 |

OTHER PUBLICATIONS

Omer Cetin, et al., "Low Complexity Channel Estimation for 3GPP LTE Downlink MIMO OFDM Systems", IEEE, Wireless Communications and Mobile Computing Conference, Jul. 4, 2011, p. 1441-1444.

* cited by examiner

*Primary Examiner* — Dac Ha (57) ABSTRACT

Embodiments of the present invention provide a channel estimation method and a receiver. The method includes: determining a channel space related matrix of each channel according to first signals received by N antennas of a receiver on each channel of M channels, where the channel space related matrix of each channel is used to indicate space correlation between the N antennas on each channel, wherein N is a positive integer greater than 1, and M is a positive integer; determining a channel fading factor filter matrix according to the channel space related matrices of the M channels, where the channel fading factor filter matrix is an N×N-dimensional matrix; and determining channel estimation of a first channel according to the channel fading factor filter matrix and channel fading factors corresponding to the N antennas when the N antennas receive first signals on the first channel.

14 Claims, 2 Drawing Sheets

FIG. 3

CHANNEL ESTIMATION METHOD AND RECEIVER

CROSS-REFERENCE TO RELATED APPLICATIONS

This application is a continuation of International Application No. PCT/CN2013/078123, filed on Jun. 27, 2013, which is hereby incorporated by reference in its entirety.

TECHNICAL FIELD

Embodiments of the present invention relate to the wireless communications field, and more specifically, to a channel estimation method and a receiver.

BACKGROUND

Channel estimation is an important part of a receiver in a communications system, and channel estimation quality of the receiver directly affects quality of signal demodulation and other related measurement.

In the prior art, a fading factor of an antenna is obtained, by means of calculation, by using a ratio of a signal received by the antenna to a transmit signal, and then noise reduction processing is performed on the obtained fading factor in a single antenna to obtain a final channel estimation value.

With development of a multiple-antenna technology, a signal-to-noise ratio (SNR) of the receiver when working is becoming lower, thereby causing inaccuracy of channel estimation.

SUMMARY

Embodiments of the present invention provide a channel estimation method and a receiver, so as to improve accuracy of channel estimation.

According to a first aspect, a channel estimation method is provided, including: determining a channel space related matrix of each channel according to first signals received by N antennas of a receiver on each channel of M channels, where the channel space related matrix of each channel is used to indicate space correlation between the N antennas on each channel, N is a positive integer greater than 1, and M is a positive integer; determining a channel fading factor filter matrix according to the channel space related matrices of the M channels, where the channel fading factor filter matrix is an N×N-dimensional matrix; and determining channel estimation of a first channel according to the channel fading factor filter matrix and channel fading factors corresponding to the N antennas when the N antennas receive first signals on the first channel, where the first channel is one of the M channels.

With reference to the first aspect, in an implementation manner of the first aspect, there is a one-to-one correspondence between the M channels and M groups of paths on which the receiver receives the first signals, and before the determining a channel space related matrix of each channel according to first signals received by N antennas of a receiver on each channel of M channels, the method further includes: determining the M groups of paths.

With reference to the first aspect or any one of the foregoing implementation manner of the first aspect, in another implementation manner of the first aspect, the determining the M groups of paths includes: grouping, according to delay differences of multiple paths on which the N antennas receive the first signals, the multiple paths to determine the M groups of paths.

With reference to the first aspect or any one of the foregoing implementation manners of the first aspect, in another implementation manner of the first aspect, the determining a channel space related matrix of each channel according to first signals received by N antennas of a receiver on each channel of M channels includes: determining, by using a formula $R_l = r_l \cdot r_l^H$, a channel space related matrix corresponding to the $l^{th}$ group of paths in the M groups of paths, where $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

where $r_{l,N}$ is used to indicate a first signal received by the $N^{th}$ antenna of the N antennas on the $l^{th}$ group of paths, and a value of l ranges from 1 to M.

With reference to the first aspect or any one of the foregoing implementation manners of the first aspect, in another implementation manner of the first aspect, the determining a channel fading factor filter matrix according to the channel space related matrices of the M channels includes: determining an expected value $E_1$ of $R_l$ on the M groups of paths, and determining the channel fading factor filter matrix $\Phi_1$ according to $E_1$ by means of KL transform or a minimum mean square error MMSE criterion; and the determining channel estimation of a first channel according to the channel fading factor filter matrix and channel fading factors corresponding to the N antennas when the N antennas receive first signals on the first channel includes: determining channel estimation corresponding to the first group of paths according to a formula $h = \Phi_1 \check{h}$, where h is the channel estimation corresponding to the first group of paths, and $$\check{h} = \begin{bmatrix} \check{h}_1 \\ \check{h}_2 \\ \vdots \\ \check{h}_N \end{bmatrix},$$

where $\check{h}_N$ is a channel fading factor corresponding to the $N^{th}$ antenna of the N antennas when the $N^{th}$ antenna of the N antennas receives a first signal on the first group of paths.

With reference to the first aspect or any one of the foregoing implementation manners of the first aspect, in another implementation manner of the first aspect, there is a one-to-one correspondence between the M channels and M time-frequency resources used by the receiver to receive the first signals.

With reference to the first aspect and any one of the foregoing implementation manners of the first aspect, in another implementation manner of the first aspect, the determining a channel space related matrix of each channel according to first signals received by N antennas of a receiver on each channel of M channels includes: determining, by using a formula $R_m(k) = Y_m(k) \cdot Y_m^H(k)$, a channel space related matrix corresponding to the $k^{th}$ subcarrier and the $m^{th}$ symbol over which the first signals are received, where the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

where $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol; and the determining a channel fading factor filter matrix according to the channel space related matrices of the M channels includes: determining an expected value $E_2$ of $R_m(k)$ on the M time-frequency resources, and determining the channel fading factor filter matrix $\Phi_2$ according to $E_2$ by means of KL transform or a minimum mean square error MMSE criterion.

According to a second aspect, a receiver is provided, including: a first determining unit, configured to determine a channel space related matrix of each channel according to first signals received, by using N antennas, by a receiving unit of the receiver on each channel of M channels, where the channel space related matrix of each channel is used to indicate space correlation between the N antennas on each channel, N is a positive integer greater than 1, and M is a positive integer; a second determining unit, configured to determine a channel fading factor filter matrix according to channel space related matrices that are of the M channels and determined by the first determining unit, where the channel fading factor filter matrix is an N×N-dimensional matrix; and a third determining unit, configured to determine channel estimation of a first channel according to the channel fading factor filter matrix determined by the second determining unit and channel fading factors corresponding to the N antennas when the N antennas receive first signals on the first channel, where the first channel is one of the M channels.

With reference to the second aspect, in an implementation manner of the second aspect, there is a one-to-one correspondence between the M channels and M groups of paths on which the receiver receives the first signals, and the receiver further includes: a fourth determining unit, configured to determine the M groups of paths.

With reference to the second aspect or any one of the foregoing implementation manner of the second aspect, in another implementation manner of the second aspect, the fourth determining unit is specifically configured to group, according to delay differences of multiple paths on which the N antennas receive the first signals, the multiple paths to determine the M groups of paths.

With reference to the second aspect or any one of the foregoing implementation manners of the second aspect, in another implementation manner of the second aspect, the first determining unit is specifically configured to determine, by using a formula $R_l = r_l \cdot r_l^H$, a channel space related matrix corresponding to the $l^{th}$ group of paths in the M groups of paths, where $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

where $r_{l,N}$ is used to indicate a first signal received by the $N^{th}$ antenna of the N antennas on the $l^{th}$ group of paths, and a value of l ranges from 1 to M.

With reference to the second aspect or any one of the foregoing implementation manners of the second aspect, in another implementation manner of the second aspect, the second determining unit is specifically configured to: determine an expected value $E_1$ of $R_l$ on the M groups of paths, and determine the channel fading factor filter matrix $\Phi_1$ according to $E_1$ by means of KL transform or a minimum mean square error MMSE criterion; and the third determining unit is specifically configured to determine channel estimation of the first group of paths according to a formula $\tilde{h} = \Phi_1 \check{h}$, where the first group of paths are paths that are in the M groups of paths and corresponding to the first channel, $\check{h}$ is the channel estimation of the first group of paths, and $$\tilde{h} = \begin{bmatrix} \tilde{h}_1 \\ \tilde{h}_2 \\ \vdots \\ \tilde{h}_N \end{bmatrix},$$

where $\check{h}_N$ is a channel fading factor corresponding to the $N^{th}$ antenna of the N antennas when the $N^{th}$ antenna of the N antennas receives a first signal on the first group of paths.

With reference to the second aspect or any one of the foregoing implementation manners of the second aspect, in another implementation manner of the second aspect, there is a one-to-one correspondence between the M channels and M time-frequency resources used by the receiver to receive the first signals.

With reference to the second aspect or any one of the foregoing implementation manners of the second aspect, in another implementation manner of the second aspect, the first determining unit is specifically configured to determine, by using a formula $R_m(k) = Y_m(k) \cdot Y_m^H(k)$, a channel space related matrix corresponding to the $k^{th}$ subcarrier and the $m^{th}$ symbol over which the first signals are received, where the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

where $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol; and the second determining unit is specifically configured to: determine an expected value $E_2$ of $R_m(k)$ on the M time-frequency resources, and determine the channel fading factor filter matrix $\Phi_2$ according to $E_2$ by means of KL transform or a minimum mean square error MMSE criterion.

In the embodiments of the present invention, a channel fading factor is filtered by using channel space correlation between multiple antennas, thereby improving accuracy of channel estimation.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions of embodiments of the present invention may be applied to various communications systems, such as: a Global System for Mobile Communications (GSM), a Code Division Multiple Access (CDMA) system, a Wideband Code Division Multiple Access (WCDMA), a general packet radio service (GPRS), a Long Term Evolution (LTE) system, a Long Term Evolution Advanced (LTE-A) system, and a Universal Mobile Telecommunications System (UMTS).

It should further be understood that in the embodiments of the present invention, user equipment (UE) includes but is not limited to a mobile station (MS), a mobile terminal (Mobile Terminal), a mobile telephone (Mobile Telephone), a handset (handset), portable equipment (portable equipment), and the like. The user equipment may communicate with one or more core networks by using a radio access network (RAN, Radio Access Network). For example, the user equipment may be a mobile telephone (or referred to as a "cellular" telephone), or a computer having a wireless communication function; the user equipment may further be a portable, pocket-sized, handheld, computer built-in, or in-vehicle mobile apparatus.

Figure 1:
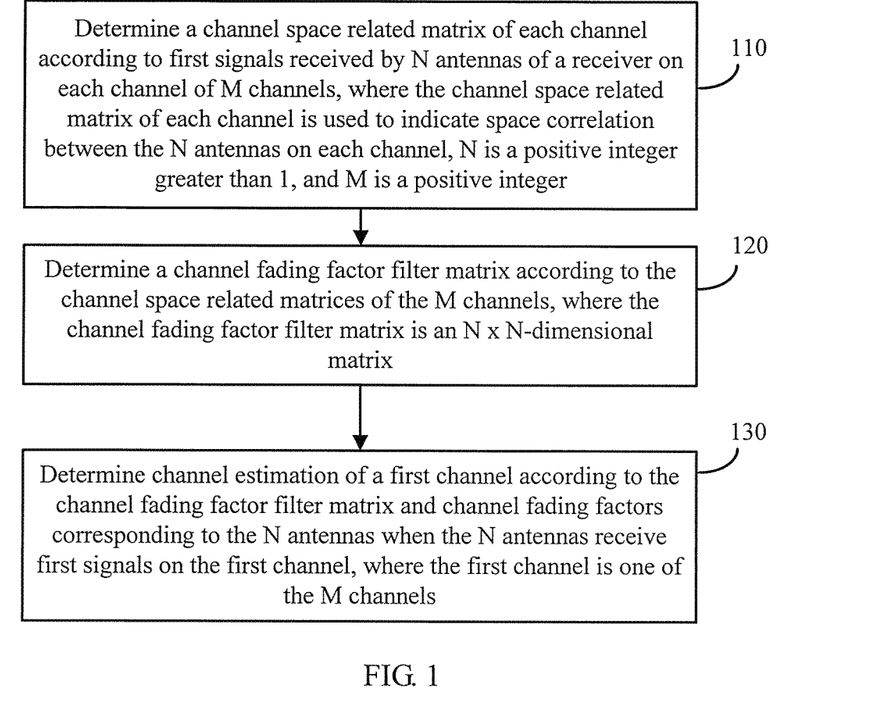
FIG. 1 is a schematic flowchart of a channel estimation method according to an embodiment of the present invention.

FIG. 1 is a schematic flowchart of a channel estimation method according to an embodiment of the present invention. The method in FIG. 1 may be executed by a receiver, for example, the receiver may be a base station, or may be a UE. The method in FIG. 1 includes:

110. Determine a channel space related matrix of each channel according to first signals received by N antennas of the receiver on each channel of M channels, where the channel space related matrix of each channel is used to indicate space correlation between the N antennas on each channel, N is a positive integer greater than 1, and M is a positive integer.

120. Determine a channel fading factor filter matrix according to the channel space related matrices of the M channels, where the channel fading factor filter matrix is an N×N-dimensional matrix.

130. Determine channel estimation of a first channel according to the channel fading factor filter matrix and channel fading factors corresponding to the N antennas when the N antennas receive first signals on the first channel, where the first channel is one of the M channels.

In this embodiment of the present invention, a channel fading factor is filtered by using channel space correlation between multiple antennas, thereby improving accuracy of channel estimation.

It should be noted that the first signal in this embodiment of the present invention may be a spread spectrum signal, or may be a despread signal.

This embodiment of the present invention sets no specific limitation on a form of the channel in step 110. For example, the channel may be a path on which the receiver receives a signal, or may be a time-frequency resource used by the receiver when the receiver receives a signal in the frequency domain.

Optionally, in an embodiment, there is a one-to-one correspondence between the M channels in step 110 and M groups of paths on which the receiver receives the first signals, and before the determining a channel space related matrix of each channel according to first signals received by N antennas of a receiver on each channel of M channels, the method in FIG. 1 may further include: determining the M groups of paths.

This embodiment of the present invention sets no limitation on a specific manner of determining the M groups of paths. Optionally, the determining the M groups of paths may include: grouping, according to delay differences of multiple paths on which the N antennas receive the first signals, the multiple paths to determine the M groups of paths.

Specifically, all paths on which the foregoing N antennas receive the first signals are first determined, then multiple paths whose delay differences fall within a threshold (for example, ¾ chip) are grouped together, and the M groups of paths are successively determined.

Optionally, in an embodiment, the determining a channel space related matrix of each channel according to first signals received by N antennas of a receiver on each channel of M channels in step 120 may include: determining, by using a formula $R_l = r_l \cdot r_l^H$, a channel space related matrix corresponding to the $l^{th}$ group of paths in the M groups of paths, where $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

where $r_{l,N}$ is used to indicate a first signal received by the $N^{th}$ antenna of the N antennas on the $l^{th}$ group of paths, and a value of l ranges from 1 to M.

Specifically, H represents a conjugate transpose, $R_l$ is a N*N-dimensional Hermitian matrix (Hermitian Matrix), a value of l ranges from 1 to M, and M Hermitian matrices may be determined by using the foregoing formula $R_l = r_l \cdot r_l^H$, where the M Hermitian matrices respectively represent channel space related matrices of the M groups of paths.

Optionally, in an embodiment, the determining a channel fading factor filter matrix according to the channel space related matrices of the M channels in step 120 may include: determining an expected value $E_l$ of $R_l$ on the M groups of paths; and determining the channel fading factor filter matrix $\Phi_l$ according to $E_l$ by means of KL transform or a minimum mean square error MMSE criterion.

This embodiment of the present invention sets no limitation on a specific manner of determining the expected value $E_l$ of $R_l$ on the M groups of paths; for example, an average value $$E_1 = \sum_{l=1}^{M} R_l$$

of $R_l$ corresponding to the M groups of paths may be calculated, or averaging or smooth filtering processing may be performed on $R_l$ in a time dimension.

The channel fading factor filter matrix $\Phi_1$ may be acquired by using $E_1$, for example, $\Phi_1$ may be acquired by using KL (Karhunen-Loeve) transform or a minimum mean square error (MMSE).

Specifically, when KL transform is used, first it is assumed that N eigenvalues of $E_1$ meet that $\lambda_1 > \lambda_2 > \ldots > \lambda_N$ and are respectively corresponding to eigenvectors $u_1, u_2, \ldots,$ and $u_N$; eigenvectors corresponding to K largest eigenvalues of $E_1$ are selected to form $U=[u_1\ u_2\ \ldots\ u_K]$, where K is less than a quantity N of antennas, and in practice, for brevity, a value of K may be 1 or 2, or may be dynamically acquired according to $$K = \operatorname{argmin}\left(\sum_{K=K+1}^{N}(\lambda_k^2 - \sigma^2) + K\sigma^2\right) = \operatorname{argmin}\left(\sum_{K=K+1}^{N}\lambda_k^2 + (2K-N)\sigma^2\right),$$

where $\sigma^2$ is a residual antenna noise of $E_1$; then, $\Phi_1$ is obtained according to $\Phi_1 = UU^H$.

When the MMSE criterion is used, $\Phi_1$ may be directly obtained by using $\Phi_1^H = (E_1 - \sigma^2 I) \ast E_1^{-1}$.

Optionally, in an embodiment, the determining channel estimation of a first channel according to the channel fading factor filter matrix and channel fading factors corresponding to the N antennas when the N antennas receive first signals on the first channel in step 130 may include: determining channel estimation of the first group of paths according to a formula $h = \Phi_1 \check{h}$, where h is the channel estimation corresponding to the first group of paths, and $$\check{h} = \begin{bmatrix} \check{h}_1 \\ \check{h}_2 \\ \vdots \\ \check{h}_N \end{bmatrix},$$

where $\check{h}_N$ is a channel fading factor corresponding to the $N^{th}$ antenna of the N antennas when the $N^{th}$ antenna of the N antennas receives a first signal on the first group of paths.

Specifically, the foregoing channel fading factor $\check{h}_N$ may be acquired by using the least square (LS, Least Square) method, for example, $$\check{h}_N = \frac{r_N}{s},$$

where $r_N$ is the first signal received by the $N^{th}$ antenna on the first group of paths, and s may be a known transmit signal, or may be a known pilot symbol.

Optionally, in another embodiment, there is a one-to-one correspondence between the M channels in step 120 and M time-frequency resources used by the receiver to receive the first signals.

It should be noted that this embodiment of the present invention sets no specific limitation on a manner of selecting the M time-frequency resources. For example, the M time-frequency resources may be M consecutive symbols selected from a same subcarrier, or may be M consecutive subcarriers corresponding to a same symbol, or may be a combination of the foregoing two, for example, most correlated M time-frequency resources are selected according to correlation between time-frequency resource blocks.

Optionally, in an embodiment, step 120 may include: determining, by using a formula $R_m(k) = Y_m(k) \cdot Y_m^H(k)$, a channel space related matrix corresponding to the $k^{th}$ subcarrier and the $m^{th}$ symbol over which the first signals are received, where the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

where $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol. Step 120 may include: determining an expected value $E_2$ of $R_m(k)$ on the M time-frequency resources; and determining the channel fading factor filter matrix $\Phi_2$ according to $E_2$ by means of KL transform or a minimum mean square error MMSE criterion.

It should be understood that a manner of performing channel estimation in the frequency domain (a channel is corresponding to a time-frequency resource) is corresponding to that in the time domain (a channel is corresponding to a path on which a first signal is received), and a difference lies in that a step of performing channel estimation and calculation for the channel estimation are both performed in the frequency domain. To avoid repetition, details are not described herein again.

Figure 2:
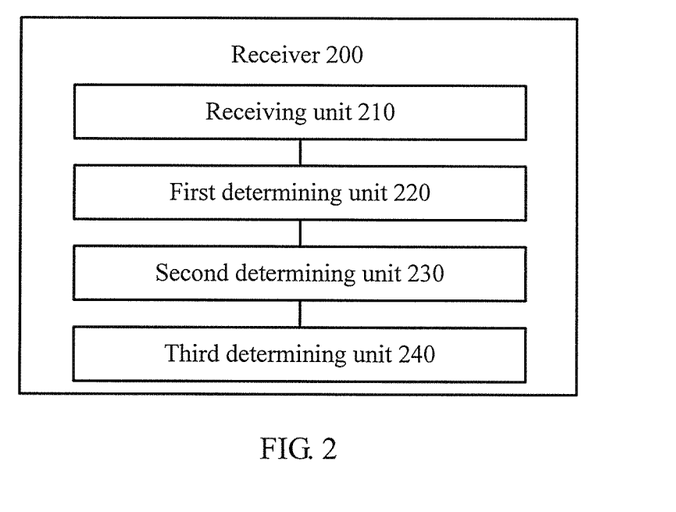
FIG. 2 is a schematic block diagram of a receiver according to an embodiment of the present invention.
Figure 3:
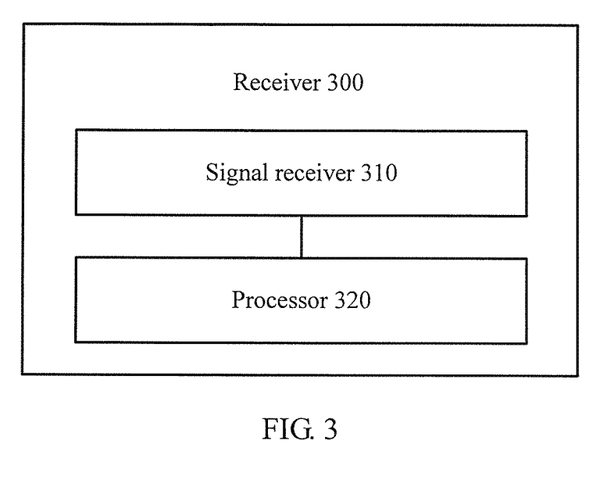
FIG. 3 is a schematic block diagram of a receiver according to another embodiment of the present invention.

With reference to FIG. 1, the foregoing describes in detail the channel estimation method according to this embodiment of the present invention. With reference to FIG. 2 to FIG. 3, the following describes in detail a receiver according to an embodiment of the present invention.

FIG. 2 is a schematic block diagram of a receiver according to an embodiment of the present invention. The receiver 200 in FIG. 2 includes a receiving unit 210, a first determining unit 220, a second determining unit 230, and a third determining unit 240.

It should be understood that, the receiver 200 in FIG. 2 can implement various steps executed by a receiver in FIG. 1. To avoid repetition, repeated descriptions are appropriately omitted.

The first determining unit 220 is configured to determine a channel space related matrix of each channel according to first signals received, by using N antennas, by the receiving unit 210 of the receiver 200 on each channel of M channels, where the channel space related matrix of each channel is used to indicate space correlation between the N antennas on each channel, N is a positive integer greater than 1, and M is a positive integer.

The second determining unit 230 is configured to determine a channel fading factor filter matrix according to channel space related matrices that are of the M channels and determined by the first determining unit 220, where the channel fading factor filter matrix is an N×N-dimensional matrix.

The third determining unit 240 is configured to determine channel estimation of a first channel according to the channel fading factor filter matrix determined by the second determining unit 230 and channel fading factors corresponding to the N antennas when the N antennas receive first signals on the first channel, where the first channel is one of the M channels.

In this embodiment of the present invention, a channel fading factor is filtered by using channel space correlation between multiple antennas, thereby improving accuracy of channel estimation.

Optionally, in an embodiment, there is a one-to-one correspondence between the foregoing M channels and M groups of paths on which the receiver 200 receives the first signals, and the receiver 200 further includes: a fourth determining unit, configured to determine the M groups of paths.

Optionally, in another embodiment, the fourth determining unit is specifically configured to group, according to delay differences of multiple paths on which the N antennas receive the first signals, the multiple paths to determine the M groups of paths.

Optionally, in another embodiment, the first determining unit 220 is specifically configured to determine, by using a formula $R_l = r_l \cdot r_l^H$, a channel space related matrix corresponding to the $l^{th}$ group of paths in the M groups of paths, where $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

where $r_{l,N}$ is used to indicate a first signal received by the $N^{th}$ antenna of the N antennas on the $l^{th}$ group of paths, and a value of l ranges from 1 to M.

Optionally, in another embodiment, the second determining unit 230 is specifically configured to: determine an expected value $E_1$ of $R_l$ on the M groups of paths, and determine the channel fading factor filter matrix $\Phi_1$ according to $E_1$ by means of KL transform or a minimum mean square error MMSE criterion; and the third determining unit 240 is specifically configured to determine channel estimation of the first group of paths according to a formula $h = \Phi_1 \check{h}$, where the first group of paths are paths that are in the M groups of paths and corresponding to the first channel, h is the channel estimation of the first group of paths, and $$\check{h} = \begin{bmatrix} \check{h}_1 \\ \check{h}_2 \\ \vdots \\ \check{h}_N \end{bmatrix},$$

where $\check{h}_N$ is a channel fading factor corresponding to the $N^{th}$ antenna of the N antennas when the $N^{th}$ antenna of the N antennas receives a first signal on the first group of paths.

Optionally, in another embodiment, there is a one-to-one correspondence between the foregoing M channels and M time-frequency resources used by the receiver 200 to receive the first signals.

Optionally, in another embodiment, the first determining unit 220 is specifically configured to determine, by using a formula $R_m(k) = Y_m(k) \cdot Y_m^H(k)$, a channel space related matrix corresponding to the $k^{th}$ subcarrier and the $m^{th}$ symbol over which the first signals are received, where the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

where $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol; and the second determining unit 230 is specifically configured to: determine an expected value $E_2$ of $R_m(k)$ on the M time-frequency resources, and determine the channel fading factor filter matrix $\Phi_2$ according to $E_2$ by means of KL transform or a minimum mean square error MMSE criterion.

FIG. 3 is a schematic block diagram of a receiver according to another embodiment of the present invention. The receiver 300 in FIG. 3 includes a signal receiver 310 and a processor 320.

It should be understood that, the receiver 300 in FIG. 3 can implement various steps executed by a receiver in FIG. 1. To avoid repetition, repeated descriptions are appropriately omitted.

The processor 320 is configured to: determine a channel space related matrix of each channel according to first signals received, by using N antennas, by the signal receiver 310 of the receiver 300 on each channel of M channels, where the channel space related matrix of each channel is used to indicate space correlation between the N antennas on each channel, N is a positive integer greater than 1, and M is a positive integer; determine a channel fading factor filter matrix according to the channel space related matrices of the M channels, where the channel fading factor filter matrix is an N×N-dimensional matrix; and determine channel estimation of a first channel according to the channel fading factor filter matrix and channel fading factors corresponding to the N antennas when the N antennas receive first signals on the first channel, where the first channel is one of the M channels.

In this embodiment of the present invention, a channel fading factor is filtered by using channel space correlation between multiple antennas, thereby improving accuracy of channel estimation.

Optionally, in an embodiment, there is a one-to-one correspondence between the foregoing M channels and M groups of paths on which the receiver 300 receives the first signals, and the processor 320 is further configured to determine the M groups of paths.

Optionally, in another embodiment, the processor 320 is specifically configured to group, according to delay differences of multiple paths on which the N antennas receive the first signals, the multiple paths to determine the M groups of paths.

Optionally, in another embodiment, the processor 320 is specifically configured to determine, by using a formula $R_l = r_l \cdot r_l^H$, a channel space related matrix corresponding to the $l^{th}$ group of paths in the M groups of paths, where $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

where $r_{l,N}$ is used to indicate a first signal received by the $N^{th}$ antenna of the N antennas on the $l^{th}$ group of paths, and a value of l ranges from 1 to M.

Optionally, in another embodiment, the processor 320 is specifically configured to: determine an expected value $E_1$ of $R_l$ on the M groups of paths; determine the channel fading factor filter matrix $\Phi_1$ according to $E_1$ by means of KL transform or a minimum mean square error MMSE criterion; and determine channel estimation of the first group of paths according to a formula $h=\Phi_1 \check{h}$, where h is the channel estimation of the first group of paths, and $$\check{h} = \begin{bmatrix} \check{h}_1 \\ \check{h}_2 \\ \vdots \\ \check{h}_N \end{bmatrix},$$

where $\check{h}_N$ is a channel fading factor corresponding to the $N^{th}$ antenna of the N antennas when the $N^{th}$ antenna of the N antennas receives a first signal on the first group of paths.

Optionally, in another embodiment, there is a one-to-one correspondence between the foregoing M channels and M time-frequency resources used by the receiver 300 to receive the first signals.

Optionally, in another embodiment, the processor 320 is specifically configured to determine, by using a formula $R_m(k)=Y_m(k)\cdot Y_m^H(k)$, a channel space related matrix corresponding to the $k^{th}$ subcarrier and the $m^{th}$ symbol over which the first signals are received, where the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

where $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol; determine an expected value $E_2$ of $R_m(k)$ on the M time-frequency resources; and determine the channel fading factor filter matrix $\Phi_2$ according to $E_2$ by means of KL transform or a minimum mean square error MMSE criterion.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:
1. A channel estimation method, comprising:
 determining a channel space related matrix of each channel according to first signals received by N antennas of a receiver on each channel of M channels, wherein the channel space related matrix of each channel is used to indicate space correlation between the N antennas on each channel, wherein N is a positive integer greater than 1, and M is a positive integer;

determining a channel fading factor filter matrix according to the channel space related matrices of the M channels, wherein the channel fading factor filter matrix is an N×N-dimensional matrix; and determining channel estimation of a first channel according to the channel fading factor filter matrix and channel fading factors corresponding to the N antennas when the N antennas receive first signals on the first channel, wherein the first channel is one of the M channels.

2. The method according to claim 1, wherein:

there is a one-to-one correspondence between the M channels and M groups of paths on which the receiver receives the first signals; and before determining a channel space related matrix of each channel according to first signals received by N antennas of a receiver on each channel of M channels, the method further comprises:

determining the M groups of paths.

3. The method according to claim 2, wherein determining the M groups of paths comprises:

grouping, according to delay differences of multiple paths on which the N antennas receive the first signals, the multiple paths to determine the M groups of paths.

4. The method according to claim 2, wherein determining a channel space related matrix of each channel according to first signals received by N antennas of a receiver on each channel of M channels comprises:

determining, by using a formula $R_l = r_l \cdot r_l^H$, a channel space related matrix corresponding to the $l^{th}$ group of paths in the M groups of paths, wherein $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

wherein $r_{l,N}$ is used to indicate a first signal received by the $N^{th}$ antenna of the N antennas on the $l^{th}$ group of paths, and a value of l ranges from 1 to M.

5. The method according to claim 4, wherein:

determining a channel fading factor filter matrix according to the channel space related matrices of the M channels comprises:

determining an expected value $E_1$ of $R_l$ on the M groups of paths, and determining the channel fading factor filter matrix $\Phi_1$ according to $E_1$ by means of KL transform or a minimum mean square error (MMSE) criterion; and determining channel estimation of a first channel according to the channel fading factor filter matrix and channel fading factors corresponding to the N antennas when the N antennas receive first signals on the first channel comprises:

determining channel estimation of the first group of paths according to a formula $h = \Phi_1 \check{h}$, wherein the first group of paths are paths that are in the M groups of paths and corresponding to the first channel, h is the channel estimation corresponding to the first group of paths, and $$\check{h} = \begin{bmatrix} \check{h}_1 \\ \check{h}_2 \\ \vdots \\ \check{h}_N \end{bmatrix},$$

wherein $\check{h}_N$ is a channel fading factor corresponding to the $N^{th}$ antenna of the N antennas when the $N^{th}$ antenna of the N antennas receives a first signal on the first group of paths.

6. The method according to claim 1, wherein there is a one-to-one correspondence between the M channels and M time-frequency resources used by the receiver to receive the first signals.

7. The method according to claim 6, wherein:

determining a channel space related matrix of each channel according to first signals received by N antennas of a receiver on each channel of M channels comprises:

determining, by using a formula $R_m(k) = Y_m(k) \cdot Y_m^H(k)$, a channel space related matrix corresponding to the $k^{th}$ subcarrier and the $m^{th}$ symbol over which the first signals are received, wherein the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

wherein $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol; and determining a channel fading factor filter matrix according to the channel space related matrices of the M channels comprises:

determining an expected value $E_2$ of $R_m(k)$ on the M time-frequency resources, and determining the channel fading factor filter matrix $\Phi_2$ according to $E_2$ by means of KL transform or a minimum mean square error MMSE criterion.

8. A receiver, comprising:

a first determining unit, configured to determine a channel space related matrix of each channel according to first signals received, by using N antennas, by a receiving unit of the receiver on each channel of M channels, wherein the channel space related matrix of each channel is used to indicate space correlation between the N antennas on each channel, wherein N is a positive integer greater than 1, and M is a positive integer;

a second determining unit, configured to determine a channel fading factor filter matrix according to channel space related matrices that are of the M channels and determined by the first determining unit, wherein the channel fading factor filter matrix is an N×N-dimensional matrix; and a third determining unit, configured to determine channel estimation of a first channel according to the channel fading factor filter matrix determined by the second determining unit and channel fading factors corresponding to the N antennas when the N antennas receive first signals on the first channel, wherein the first channel is one of the M channels.

9. The receiver according to claim 8, wherein:
there is a one-to-one correspondence between the M channels and M groups of paths on which the receiver receives the first signals; and
the receiver further comprises:
a fourth determining unit, configured to determine the M groups of paths.

10. The receiver according to claim 9, wherein the fourth determining unit is configured to group, according to delay differences of multiple paths on which the N antennas receive the first signals, the multiple paths to determine the M groups of paths.

11. The receiver according to claim 9, wherein the first determining unit is configured to determine, by using a formula $R_l = r_l \cdot r_l^H$, a channel space related matrix corresponding to the $l^{th}$ group of paths in the M groups of paths, wherein $R_l$ is the channel space related matrix corresponding to the $l^{th}$ group of paths, $r_l$ is used to indicate first signals received by the N antennas on the $l^{th}$ group of paths, and $$r_l = \begin{bmatrix} r_{l,1} \\ r_{l,2} \\ \vdots \\ r_{l,N} \end{bmatrix},$$

wherein $r_{l,N}$ is used to indicate a first signal received by the $N^{th}$ antenna of the N antennas on the $l^{th}$ group of paths, and a value of l ranges from 1 to M.

12. The receiver according to claim 11, wherein:
the second determining unit is configured to: determine an expected value $E_1$ of $R_l$ on the M groups of paths, and determine the channel fading factor filter matrix $\Phi_1$ according to $E_1$ by means of KL transform or a minimum mean square error MMSE criterion; and
the third determining unit is configured to: determine channel estimation of the first group of paths according to a formula $h = \Phi_1 \check{h}$, wherein the first group of paths are paths that are in the M groups of paths and corresponding to the first channel, h is the channel estimation of the first group of paths, and $$\check{h} = \begin{bmatrix} \check{h}_1 \\ \check{h}_2 \\ \vdots \\ \check{h}_N \end{bmatrix},$$

wherein $\check{h}_N$ is a channel fading factor corresponding to the $N^{th}$ antenna of the N antennas when the $N^{th}$ antenna of the N antennas receives a first signal on the first group of paths.

13. The receiver according to claim 8, wherein there is a one-to-one correspondence between the M channels and M time-frequency resources used by the receiver to receive the first signals.

14. The receiver according to claim 13, wherein the first determining unit is configured to: determine, by using a formula $R_m(k) = Y_m(k) \cdot Y_m^H(k)$, a channel space related matrix corresponding to the $k^{th}$ subcarrier and the $m^{th}$ symbol over which the first signals are received, wherein the $k^{th}$ subcarrier and the $m^{th}$ symbol are one of the M time-frequency resources, and $$Y_m(k) = \begin{bmatrix} Y_{m,1}(k) \\ Y_{m,2}(k) \\ \vdots \\ Y_{m,N}(k) \end{bmatrix},$$

wherein $Y_{m,N}(k)$ is a first signal received by the $N^{th}$ antenna of the N antennas over the $k^{th}$ subcarrier and the $m^{th}$ symbol, and $R_m(k)$ is the channel space related matrix corresponding to the $k^{th}$ subcarrier and the $m^{th}$ symbol; and
the second determining unit is configured to: determine an expected value $E_2$ of $R_m(k)$ on the M time-frequency resources; and determine the channel fading factor filter matrix $\Phi_2$ according to $E_2$ by means of KL transform or a minimum mean square error MMSE criterion.

* * * * *